(12) United States Patent
Kelley et al.

(10) Patent No.: US 9,647,374 B2
(45) Date of Patent: May 9, 2017

(54) DISTRIBUTION TAP SECURITY COVER

(76) Inventors: Karl Kelley, Henderson, NV (US);
Steven Jon Hartshorn, Henderson, NV (US)

(*) Notice: Subject to any disclaimer, the term of this patent is extended or adjusted under 35 U.S.C. 154(b) by 547 days.

(21) Appl. No.: 12/855,742

(22) Filed: Aug. 13, 2010

(65) Prior Publication Data

US 2014/0017919 A1 Jan. 16, 2014

Related U.S. Application Data

(60) Provisional application No. 61/309,923, filed on Mar. 3, 2010.

(51) Int. Cl.
| | | |
|---|---|---|
| *H01R 13/453* | (2006.01) | |
| *H01R 13/447* | (2006.01) | |
| *H01R 13/639* | (2006.01) | |
| *H01R 25/00* | (2006.01) | |
| *H02G 3/08* | (2006.01) | |

(52) U.S. Cl.
CPC ......... *H01R 13/453* (2013.01); *H01R 13/447* (2013.01); *H01R 13/6397* (2013.01); *H01R 25/00* (2013.01); *H02G 3/081* (2013.01)

(58) Field of Classification Search
CPC .......... H02G 3/08; H02G 15/10; H02G 15/02; H05K 5/00
USPC ......... 439/133, 896, 306; 174/50, 59, 48, 52
See application file for complete search history.

(56) References Cited

U.S. PATENT DOCUMENTS

| | | | | |
|---|---|---|---|---|
| 1,441,599 | A * | 1/1923 | Platt .............................. | 220/3.8 |
| 4,120,182 | A * | 10/1978 | Michelman et al. ............ | 70/63 |
| 4,370,516 | A * | 1/1983 | Bailey et al. ................... | 174/59 |
| 4,381,063 | A * | 4/1983 | Leong ............................ | 220/242 |
| 4,502,609 | A * | 3/1985 | Christatos ...................... | 220/3.8 |
| 4,676,569 | A * | 6/1987 | Lambert et al. ............... | 439/133 |
| 5,007,258 | A * | 4/1991 | Mahaney ........................ | 70/159 |
| 5,315,849 | A * | 5/1994 | Georgopoulos .................. | 70/34 |
| 5,764,729 | A * | 6/1998 | Black et al. .................... | 379/44 |
| 6,145,683 | A * | 11/2000 | Taniguchi ..................... | 220/4.02 |
| 6,381,145 | B1 * | 4/2002 | Chen et al. .................... | 361/752 |
| 6,541,699 | B1 * | 4/2003 | Lindemulder et al. ......... | 174/50 |
| 6,979,777 | B2 * | 12/2005 | Marcou et al. ................. | 174/50 |
| 7,235,740 | B2 * | 6/2007 | Dinh .............................. | 174/67 |
| 7,448,235 | B2 * | 11/2008 | Ely et al. ........................... | 70/2 |

* cited by examiner

*Primary Examiner* — Timothy Thompson
*Assistant Examiner* — Michael F McAllister
(74) *Attorney, Agent, or Firm* — Christopher L. Benner

(57) ABSTRACT

A security cover for a distribution tap that is mounted over the top of the tap preventing access to the service drop ports on the tap. The security cover includes one or more walls, a lid allowing access through the security cover to the tap, a base plate attachable to the tap and notches in at least one wall for cable access. The lid and walls fit over and enclose the service drop ports of the tap. The lid is attachable to at least one of the walls via a z-hinge and a plunger lock is used to secure the lid to the walls. One side of the base plate is attachable to the walls and the opposite side of the base plate is attachable to the tap. The base plate is substantially open to the top surface of the tap and is attachable via the tap's existing mounting points.

14 Claims, 13 Drawing Sheets

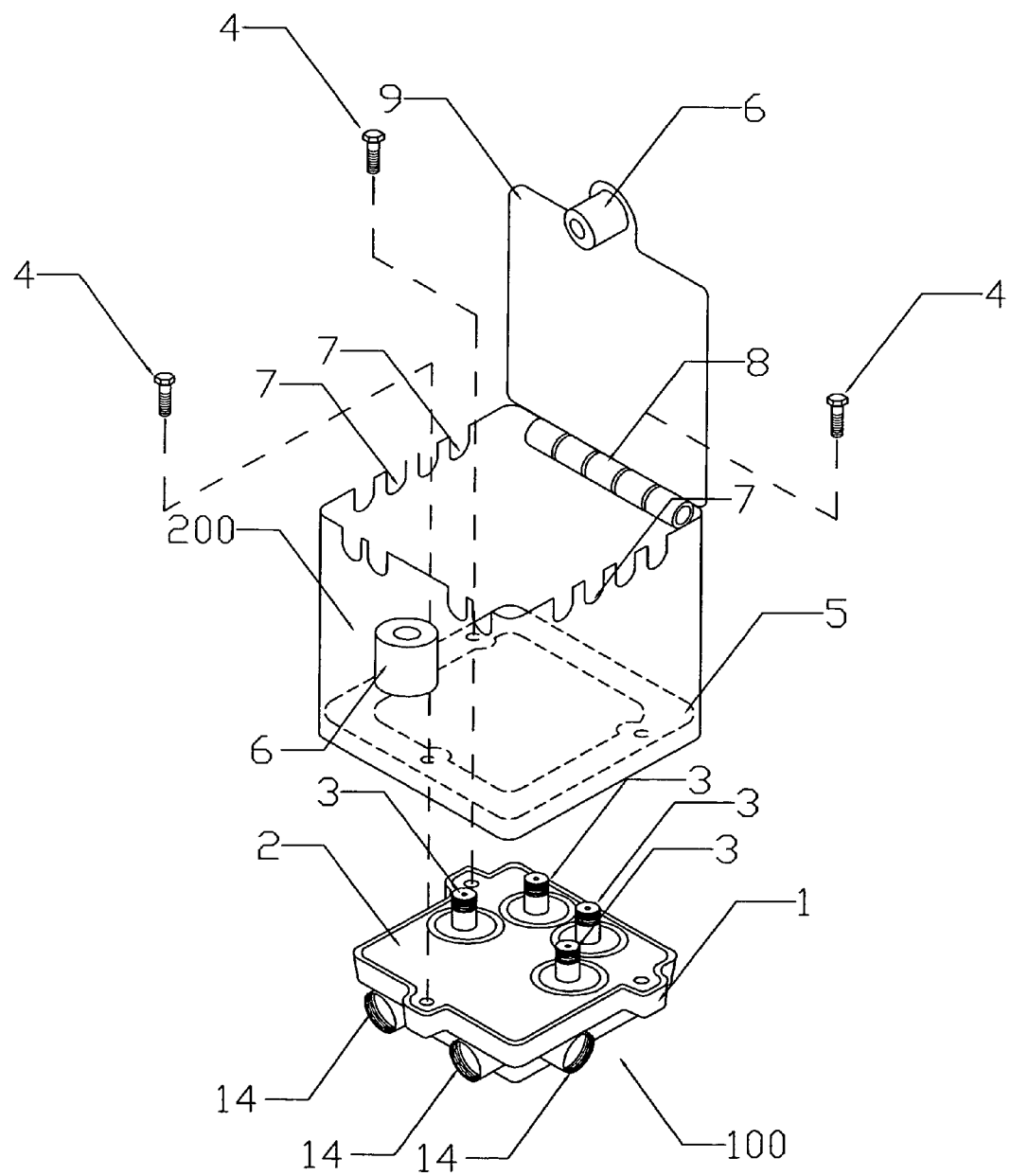

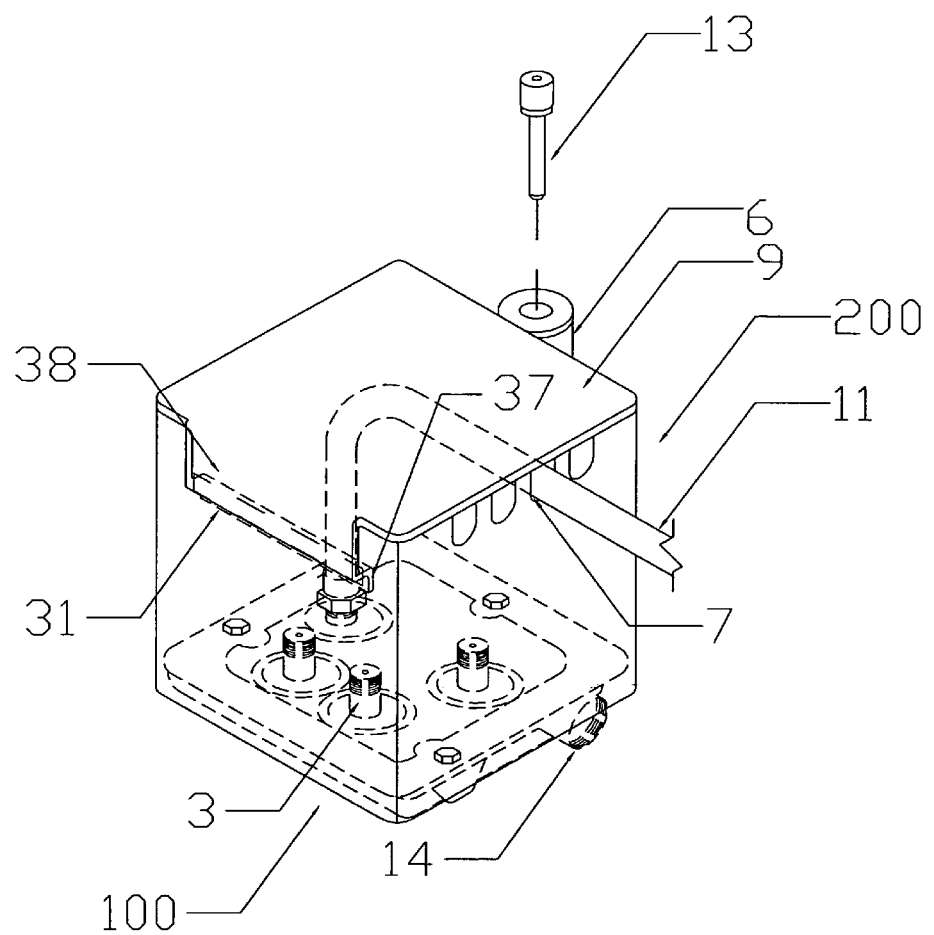

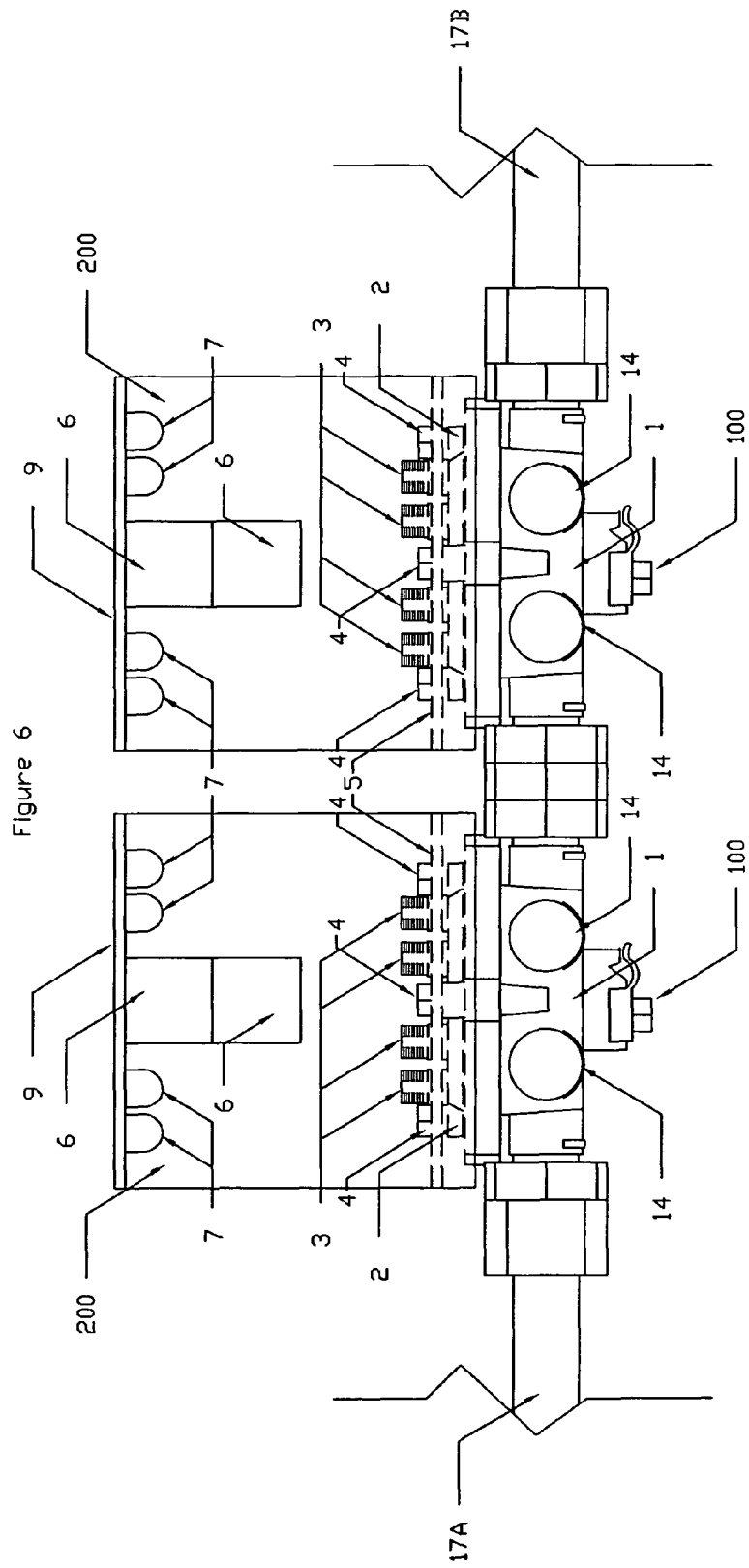

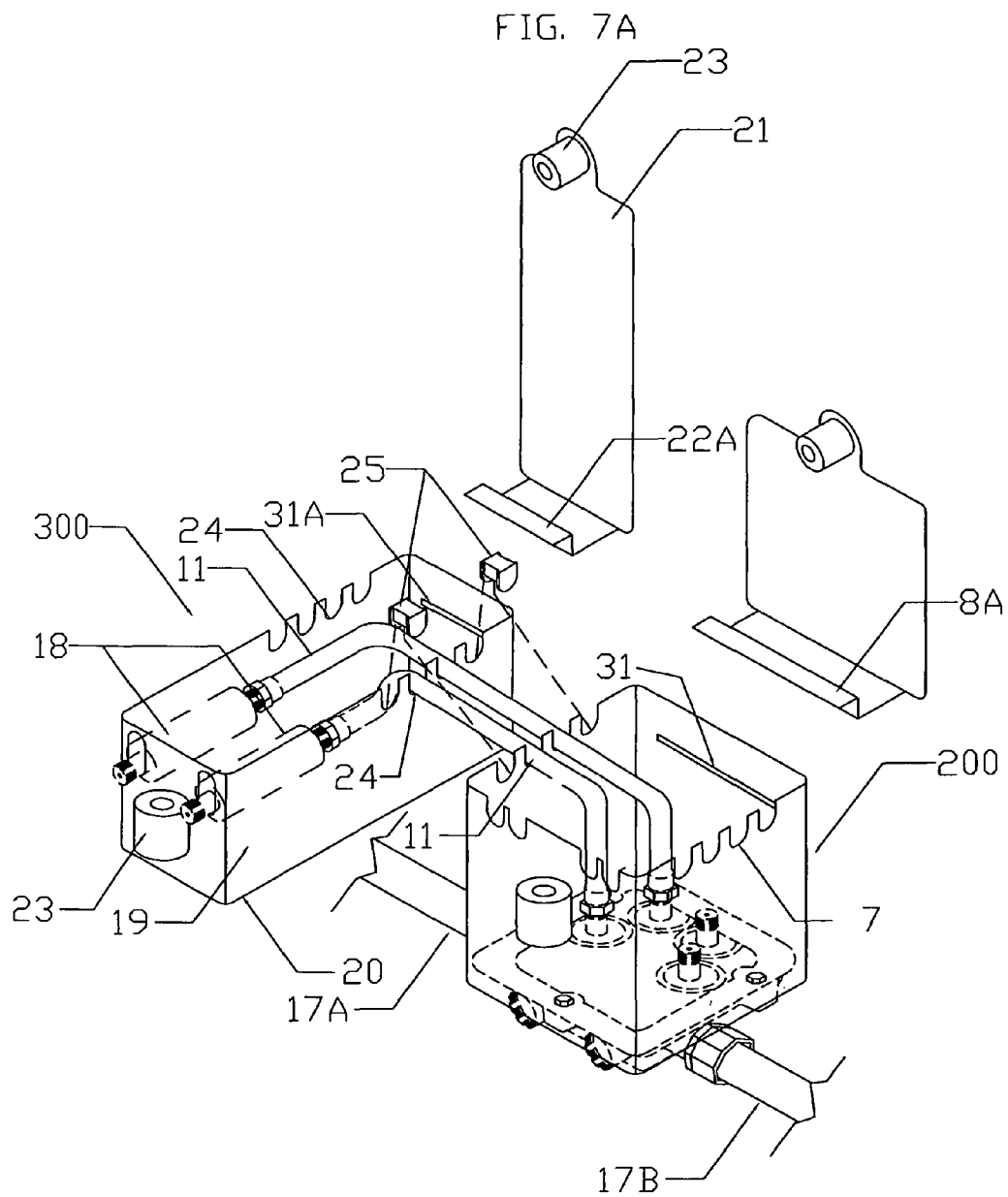

DISTRIBUTION TAP SECURITY COVER

A security cover for telecommunications and cable television distribution taps is disclosed.

BACKGROUND

Distribution taps are used in the telecommunication, cable TV and other industries to distribute signals. FIG. 1 shows a commonly used distribution tap 100. The tap includes a housing 1, a face plate 2, a plurality of service drop ports 3, one or more input/output/test ports 14, and one or more holes 16 through which bolts or other similar fastening devices may be passed to attach the faceplate 2 to the housing 1. FIG. 2 shows how a signal may flow through a typical distribution tap 100 used in the cable TV industry. The signal may be carried on a line-in 17A leading into an input/output/test port 14 of the distribution tap 100. The signal is made available to the service drop ports 3 and then continues through the distribution tap through a line-out 17B at a second input/output/test port 14. One or more service drop cables 11 may be attached to the service drop ports 3 (see FIGS. 4 and 4a and the related discussion below with respect to service drop lines 11) and the signal from the line-in 17A will be carried through the service drop cable(s) 11 which may be attached to in this example a cable TV box or directly to a cable-ready TV. The line-out 17B may then carry the signal to down-line distribution taps for further distribution of the signal. It is typical that there is a pair of input/output/test ports 14 that lead to the same service drop ports 3. The line-in 17A may be attached to either one of the input pair and line-out 17B may be attached to either one of the output pair. A technician may then use special instruments inserted at the unused input/output/test port 14 to test various characteristics of the signal being carried.

Cable TV signals and many other telecommunications signals are commonly not made available free of charge. For example, cable TV subscribers must pay to obtain the signal being carried or supplied by the line-in 17A. Once a subscriber has paid, the cable TV provider attaches a service drop cable 11 to a service drop port 3 on a distribution tap 100 near the subscriber's house or place of business. Distribution taps 100 are commonly located in underground/aboveground storage devices such as vaults, on telephone poles or merely in a cable line. The storage devices may or may not be locked or secure. Accordingly, it is possible to obtain a cable TV or other telecommunications signal without paying a fee by illegally attaching a service drop cable 11 to an open unsecured service drop port 3.

There are existing devices to deter illegal tapping of distribution taps 100 and service drop ports 3. For example, service port terminators may be placed in unused service ports 3. However, the terminators are removed by a simple tool that is inexpensive and available for purchase from any number of online suppliers. Moreover, the tool simply makes it faster and easier to remove the terminator; there are several ways to remove a terminator even without a tool. Other devices include security sleeves that make it difficult to remove a service drop cable 11 from a filter 18 and attach it directly to a service port 3, see FIGS. 7 and 7a. There are also numerous devices that completely enclose distribution taps 100 and other connecting devices within a locking enclosure. Such devices preclude access to the test ports 14 unless the enclosure is unlocked. They are also cumbersome and move independently from the distribution tap 100.

Disclosed herein is a security cover that attaches directly to the distribution tap faceplate. Unlike the prior art that merely encloses the distribution tap, any attempt to cut or pry the security cover off will cause loss or decreased signal generating a trouble call. Prior art which completely enclosed the distribution tap but is not attached to it, could be opened without damaging the distribution tap thus enabling the removal of the distribution tap to gain access to the ports. The disclosed security cover, being attached directly to the distribution tap does not depend on walls or mounting surfaces other than the distribution tap faceplate, although the assembled security cover and distribution tap may be attached to walls or other mounting services as desired. The access holes for the service drop cables on the security cover are designed to be small so no tools or any other means can be used to attach cable to an open port on the tap unlike the relatively large entry paths on prior art devices. Other benefits of the disclosed security cover over the prior art include: easy access to the input/output/test ports without unlocking the security cover; designed gaps within the security cover to prevent water damage to the distribution tap; installation can be in underground/aboveground storage devices, telephone poles or on-line aerial locations; the compact design will not interfere with size constraints of small or crowded vaults or interfere with each other in multiple tap chains; the design allows for a minimum bend radius for the cable drops to be maintained; and no other security devices i.e. port terminator or sleeves need to be installed when using the security cover.

SUMMARY

Disclosed herein is a security cover for a distribution tap that is mounted over the top of the tap preventing access to the service drop ports on top of the tap. The security cover includes one or more walls surrounding at least the top of the tap, a lid allowing access through the security cover to the tap, a lock to secure the lid to the walls, openings in the security cover for cable. The security cover is secured to the tap via the interior of the security cover. In one embodiment, the security cover is attachable to the tap via the tap's existing mounting points. In some embodiments the openings for cable comprise notches in one or more of the walls. In other embodiments the openings are notches in the lid.

The security cover may also include a base plate. In that embodiment one side of the base plate is attachable to the walls and the opposite side of the base plate is attachable to the tap. The base plate has one or more openings to the top surface of the tap. In other embodiments the base plate is substantially open to the tap. In some embodiments the base plate is attachable to the tap via the tap's existing mounting points.

The lock used may be a barrel and plunger lock or other types of locks. The lid of the security cover may be attached to the wall of the security cover via an interior hinge or, in other embodiments, via a Z-hinge. Alternatively, the lid could be attached to the walls and secured by the use of two locks.

Also disclosed herein is an attachable filter security box that can be used in conjunction with the security cover.

In one embodiment of a security cover for a distribution tap that is mounted over the top of the tap preventing access to the service drop ports on top of the tap disclosed herein the security cover includes one or more walls surrounding at least the top of the tap, and a lid allowing access through the security cover to the tap. The lid is attachable to at least one of the walls via a z-hinge. A barrel and plunger lock is used to secure the lid to the walls. The security cover also includes a base plate. One side of the base plate is attachable to the walls and the opposite side of the base plate is attachable to the tap via the tap's existing mounting points. The base plate is substantially open to the top surface of the tap. The security cover includes notches in at least one wall for cable. In one embodiment of the security cover an attachable filter security box is also disclosed.

BRIEF DESCRIPTION OF DRAWINGS

FIG. 3 is a perspective view of one embodiment of the security cover with an interior hinge showing how it is installed on a distribution tap;

FIG. 4A is a perspective view of another embodiment of the security cover with an Z-hinge installed on a distribution tap;

FIG. 6 is a side view of two security covers chained together;

FIG. 7A is a perspective view of another embodiment of the security cover with a Z-hinge and an attachable filter security box.

DESCRIPTION

Figure 1:
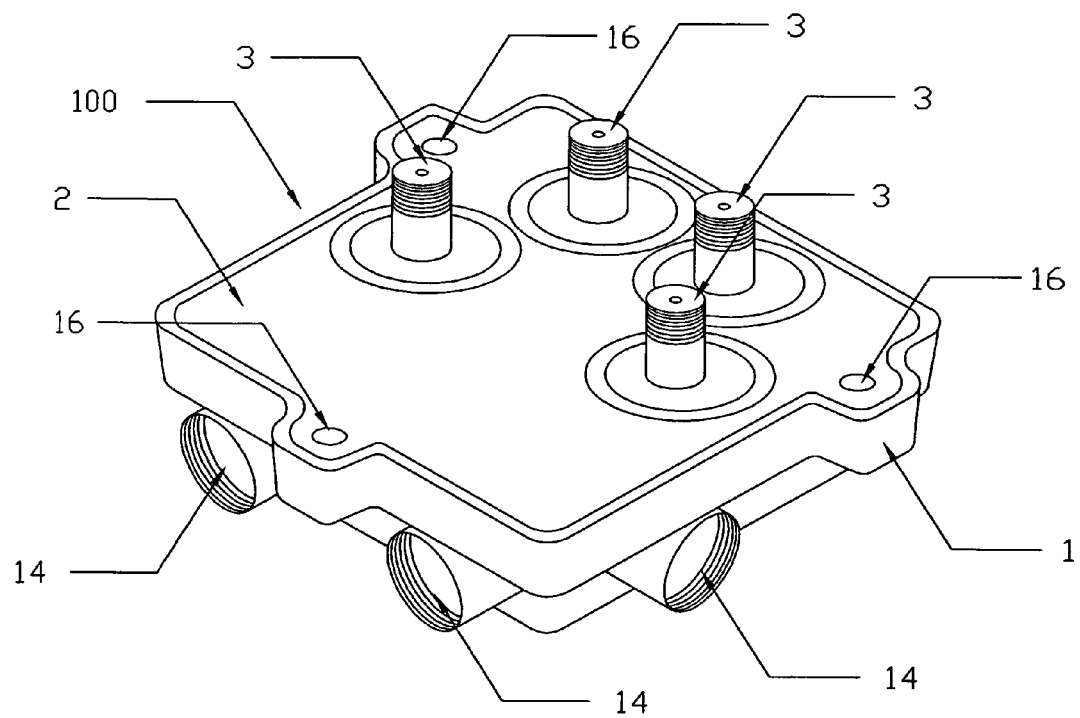
FIG. 1 is a perspective of a typical distribution tap.
Figure 2:
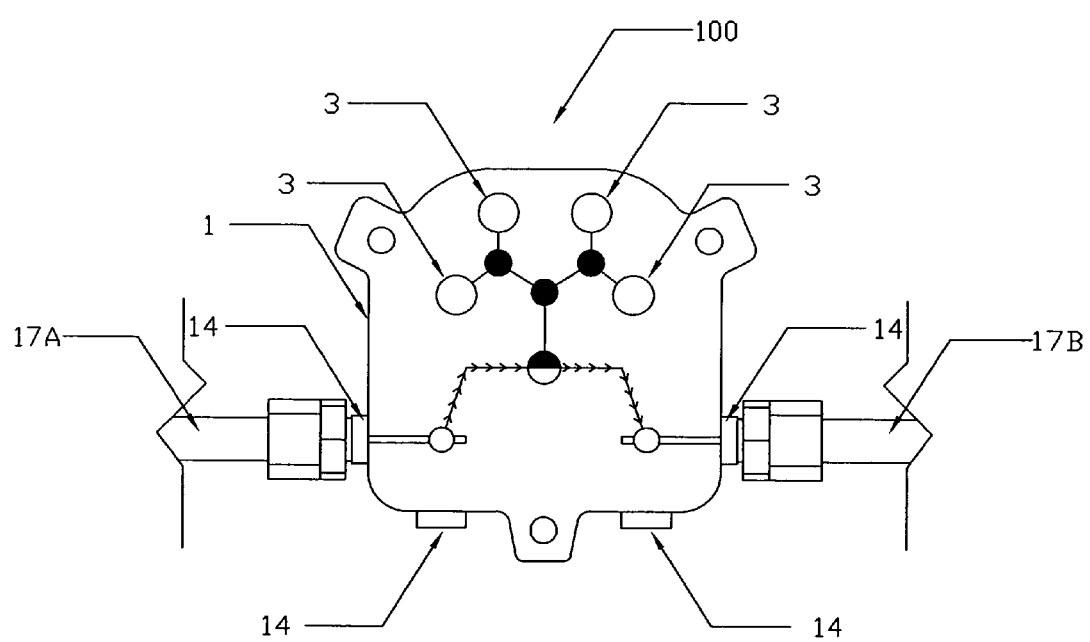
FIG. 2 is a block diagram showing how a signal may flow through a typical distribution tap.

FIGS. 3, 3A, 4 and 4A show exploded and assembled views respectively of two embodiments of the security cover 200 as it would be attached to a distribution tap 100. The security cover 200 is attached to the distribution tap housing 1 with the existing fasteners 4 of the distribution tap 100. The fasteners 4 go through the base plate 5 of the security cover 200 and the face plate 2 of the distribution tap 100. The fasteners 4 are on the interior of the security cover 200 so that once the security cover 200 is locked the fasteners 4 are not accessible. However, the security cover 200 may be attached via other means as well. For example, new or different attachment points could be drilled into the distribution tap 100 to use to attach the security cover 200. Indeed, one embodiment of the security cover 200 may be configured without a base plate 5. In this embodiment, the walls or sides 10 of the security cover 100 may incorporate attachment points through which the fasteners 4 of the distribution tap 100 may pass for attachment of the security cover 200 to the distribution tap 100 at the distribution taps 100 existing mounting points or new mounting points may be drilled. Other attachment points and methods may be used such as clamping the security cover onto the tap, attachment via the service drop points, etc.

Figure 5:
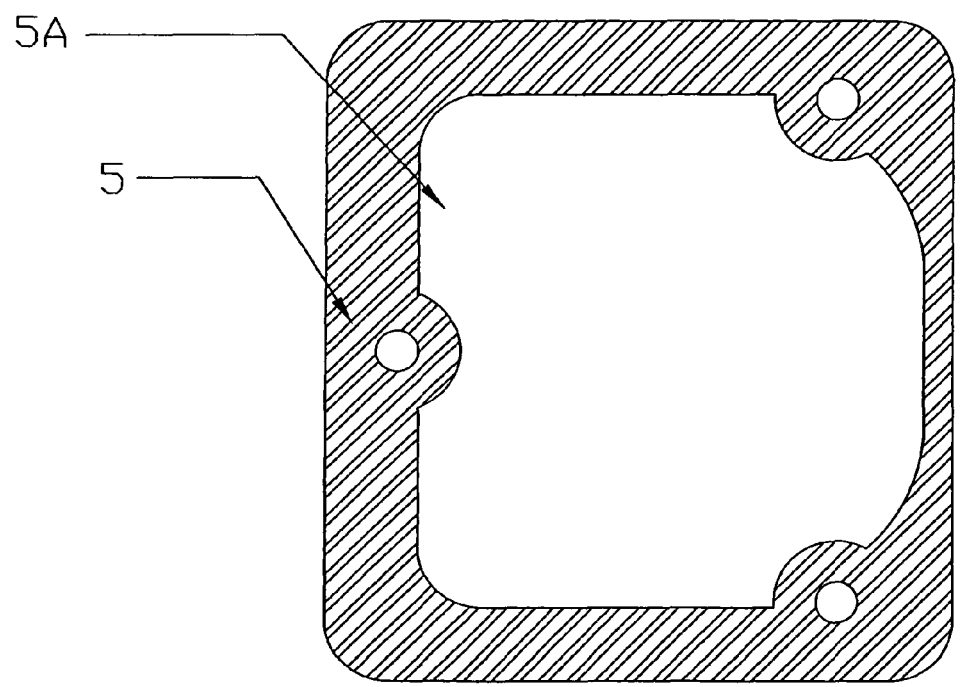
FIG. 5 is a perspective view of another embodiment of the security cover base plate.
Figure 5A:
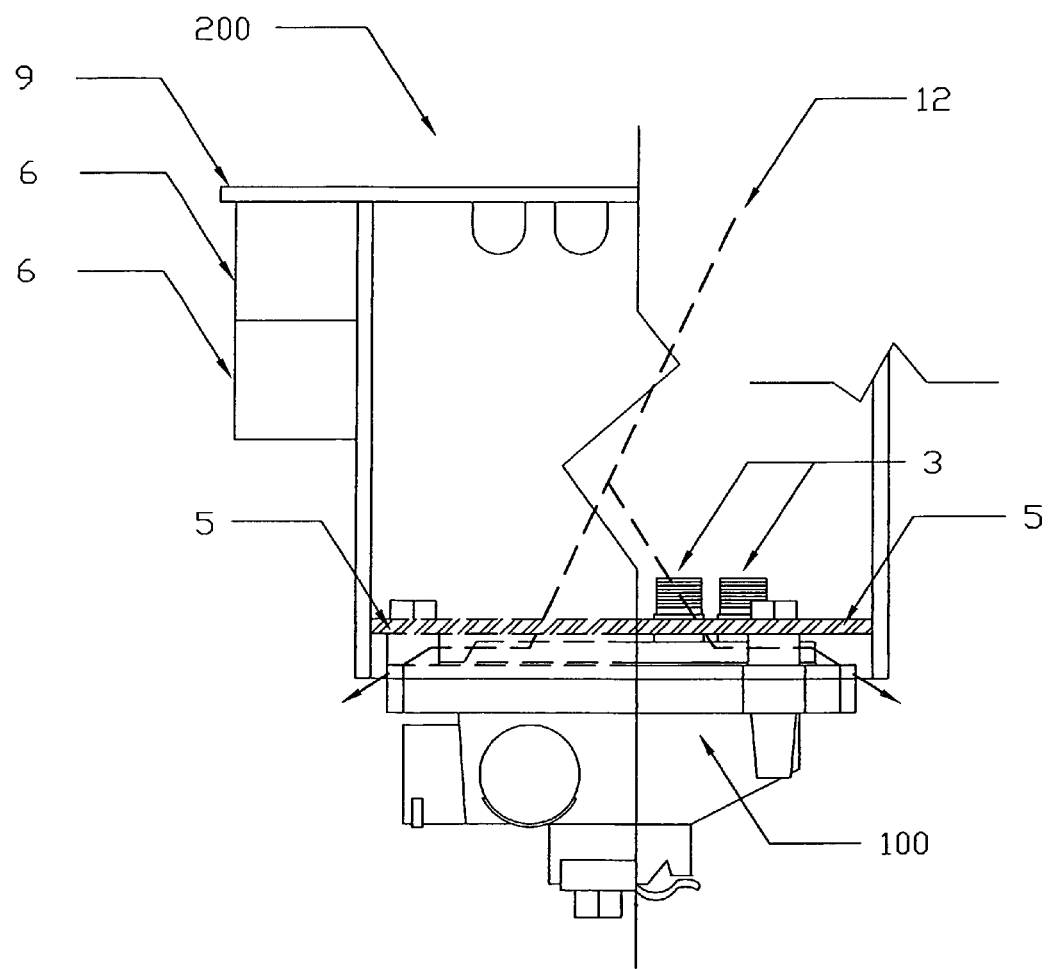
FIG. 5A contains a detailed views of the security cover showing the drainage feature of the security cover.

With reference to FIG. 5, in embodiments that use a base plate 5, the base plate 5 of the security cover 200 is open in the middle 5A to accommodate the fitting of the base plate 5 over the distribution tap 100, as shown in FIG. 5A, and the service drop ports 3 of the distribution tap 100. Rather than being substantially open as is depicted in FIG. 5, in some embodiments the base plate 5 could instead have one or more openings placed and sized such that only access to the service drop ports 3 is available and not the entire face plate 2 of the distribution tap 100. In either case, the baseplate 5 is preferably sized such that when it is attached to the distribution tap 100 the perimeter of the middle 5A of the base plate 5 of the security cover 200 is slightly larger than the perimeter of the faceplate 2 and housing 1 of the distribution tap 100 creating a small gap between the middle 5A of the base plate 5 and the distribution tap 100, as shown in FIG. 5. FIG. 5A shows a gap that will allow water to drain out 12 of the assembled distribution tap 100 and security cover 200 while preventing access of tools. In embodiments wherein a base plate 5 is not used, the perimeter of the side(s) or wall(s) 10 of the security cover 100 is preferably sized to provide a gap for drainage.

Figure 3A:
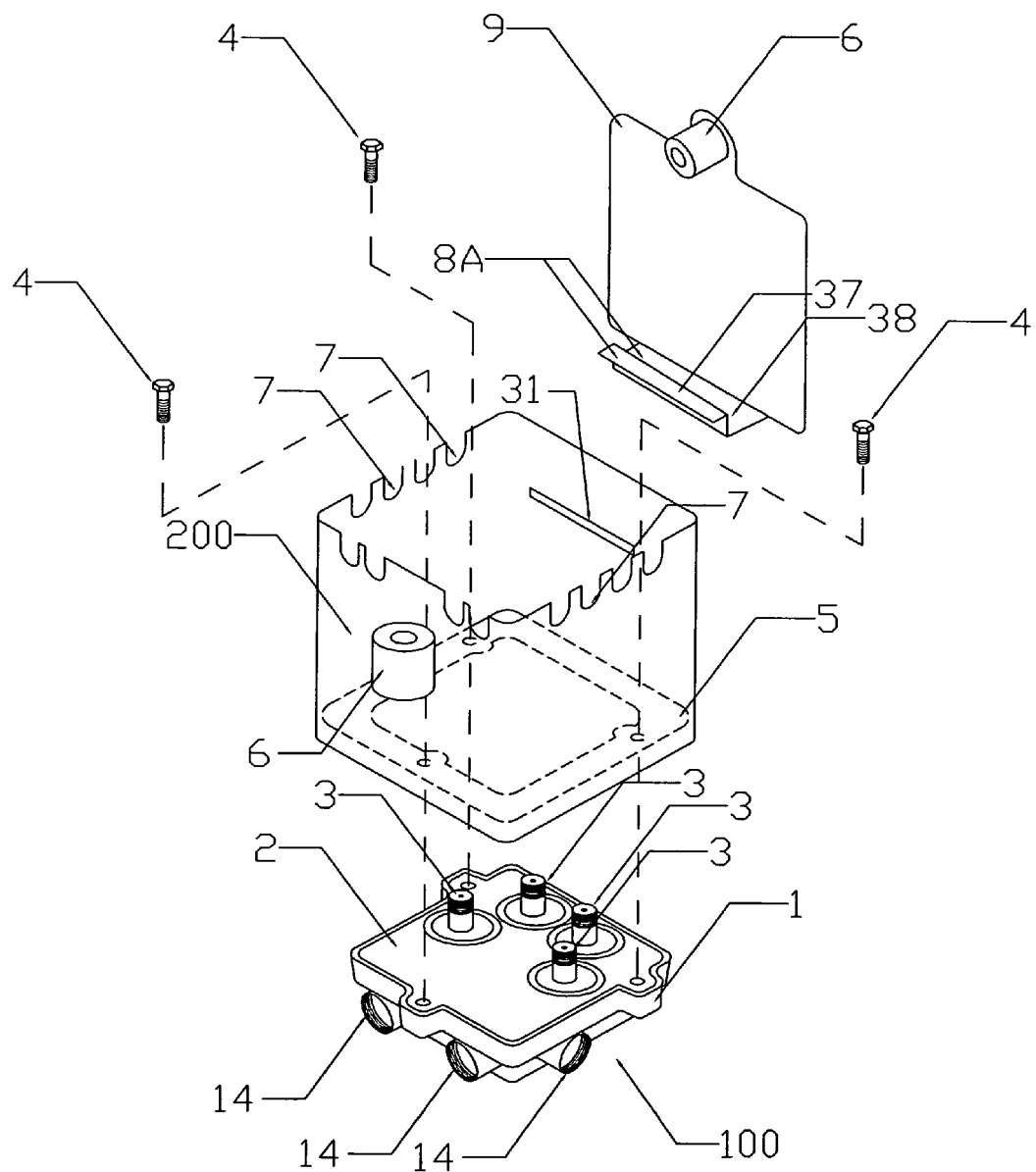
FIG. 3A is a perspective view of another embodiment of the security cover with a Z-hinge showing how it is installed on a distribution tap.
Figure 4:
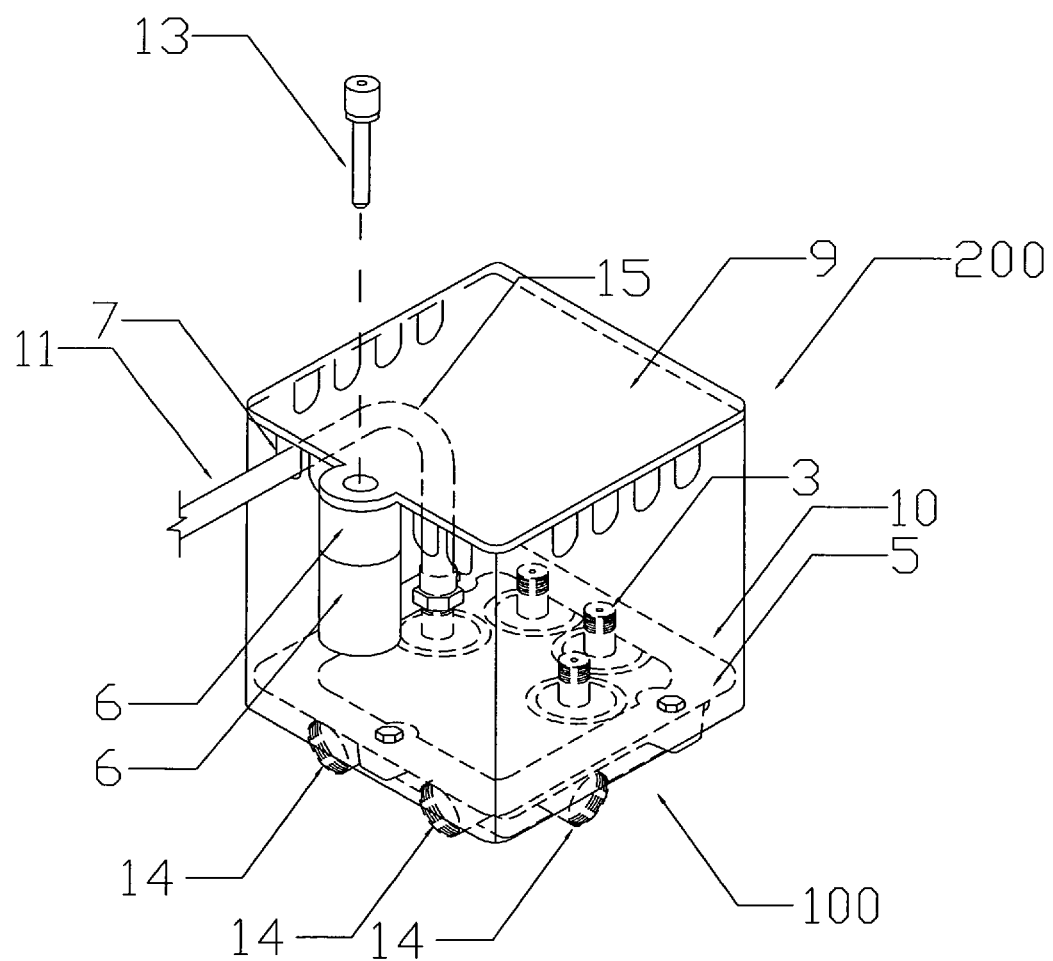
FIG. 4 is a perspective view of one embodiment of the security cover with an interior hinge installed on a distribution tap.

The security cover 200 includes four sides 10 and a lid 9 attached via a hinge 8 or 8A. In one embodiment, as shown in FIGS. 3A and 4A, the hinge is preferably a Z-hinge 8A. The Z-hinge 8A comprises two parts—a Z-hinge locking tab 37 and a Z-hinge exterior tab 38. The Z-hinge tabs 37, 38 are configured so that when lid 9 is rotated closed Z-hinge locking tab 37 is inserted from the exterior of security cover 200 into the interior of the security cover 200 though hinge slot 31 where it is secured and cannot be tampered with. However, as shown FIGS. 3 and 4, the hinge could also be an interior hinge 8 which would also prevent tampering when lid 9 is rotated closed and the security cover 200 is locked. The cover sides 10 and the lid 9 are preferably made of hardened steel or some other material difficult to cut or otherwise breech. The security cover 200 also includes means for locking the lid 9 to at least one of the sides 10. In the embodiment shown in FIGS. 4 and 4A, the means for locking comprises a barrel or plunger type lock 13. In this embodiment, the security cover 200 includes a lock housing 6 incorporated into the lid 9 and one of the sides 10 designed to accept a barrel or plunger type lock 13. Other types of locks and lock housings are intended to be within the scope of this disclosure.

In FIGS. 3 and 3A, the lid 9 is shown in an open (FIG. 3) or removed (FIG. 3A), unlocked position. In the open or removed position, the service drop ports 3 of the distribution tap 100 are accessible. In the open or removed positions, service drop cables 11 may be attached and detached from the service drop ports 3. With reference to FIGS. 3A and 4A, after attaching the service drop cable 11 with the lid in an open or removed position, the service drop cable 11 is laid in a service drop cable notch 7 which allows the lid 9 to be closed securely against the cover sides 10 as seen in FIGS. 4 and 4A. In some embodiments, the security cover may instead be provided with service drop cable notches in the lid or there may be notches in both the lid 9 and the sides 10. Also, holes through the lid 9 and/or the sides 10 may be used instead of or in addition to the service drop cable notches 7. With reference to FIGS. 3A and 4A, when closing lid 9, the "Z" hinge 8A is inserted from the outside of the security cover 200 into hinge slot 31 on one side of the security cover 200 as lid 9 is rotated closed. In an alternative embodiment shown in FIGS. 3 and 4, the lid 9 is simply rotated closed.

In either of the embodiments shown in FIGS. 3 and 4 or in FIGS. 3A and 4A, after lid 9 is closed, there is sufficient overlap of the Z-hinge 8A (specifically, the Z-hinge locking tab 37, which is now in the interior of the security cover 200) or coverage of the rotating hinge 8 by the lid 9 to prevent removal when a barrel or plunger type lock 13 is installed. Other types of hinges and hinge placements are certainly possible in various embodiments. Indeed, in some embodiments the lid may be secured by the use of two or more locks without the use of a hinge. Various shapes and sizes of lid 9 are intended to be within the scope of this disclosure. The placement of the service drop cable notches 7 are preferably along the edge of the cover sides 10 opposite the face plate 2 of the distribution tap 100 and the cover sides 10 are of such a height so as to be able to maintain a minimum bend radius 15 of the service drop cable 11 when attached to a service drop port 3. However, other configurations with respect to placement of service drop cable notches 7 and the cover sides 10 are certainly possible. The service drop cable notches 7 are preferably no larger than needed to lay the service drop cable 11 in and allow the lid 9 to close so that it would be difficult to use a tool to gain access through an unused service drop cable notch 7 to attach a cable to an unused service drop port 3 while the security cover 200 is locked.

The lid 9 is shown in the closed position in FIGS. 4 and 4A. With continuing reference to FIGS. 4 and 4A, the lid 9 may then be locked by inserting the barrel/plunger style lock 13 into the lock housing 6. Once the lid 9 is locked, the service drop ports 3 are not accessible. However, the input/output/test ports 14 of the distribution tap 100 remain accessible even when the security cover 200 is locked. This makes it much easier and quicker for a technician to diagnose problems without having to unlock the security cover 200 or remove service drop port terminators or security sleeves as he or she would be required to do with prior art devices.

Because the width and length of the security cover 200 is only slightly larger than the width and length of the distribution tap 100, the security cover 200 is particularly useful in small or crowded vaults and in multi-tap chains taking up little more room than the distribution taps themselves. FIG. 6 shows security covers 200 attached to two distribution taps 100 in a two-tap chain; however, the chains can be of any length and configuration as needed.

Figure 7:
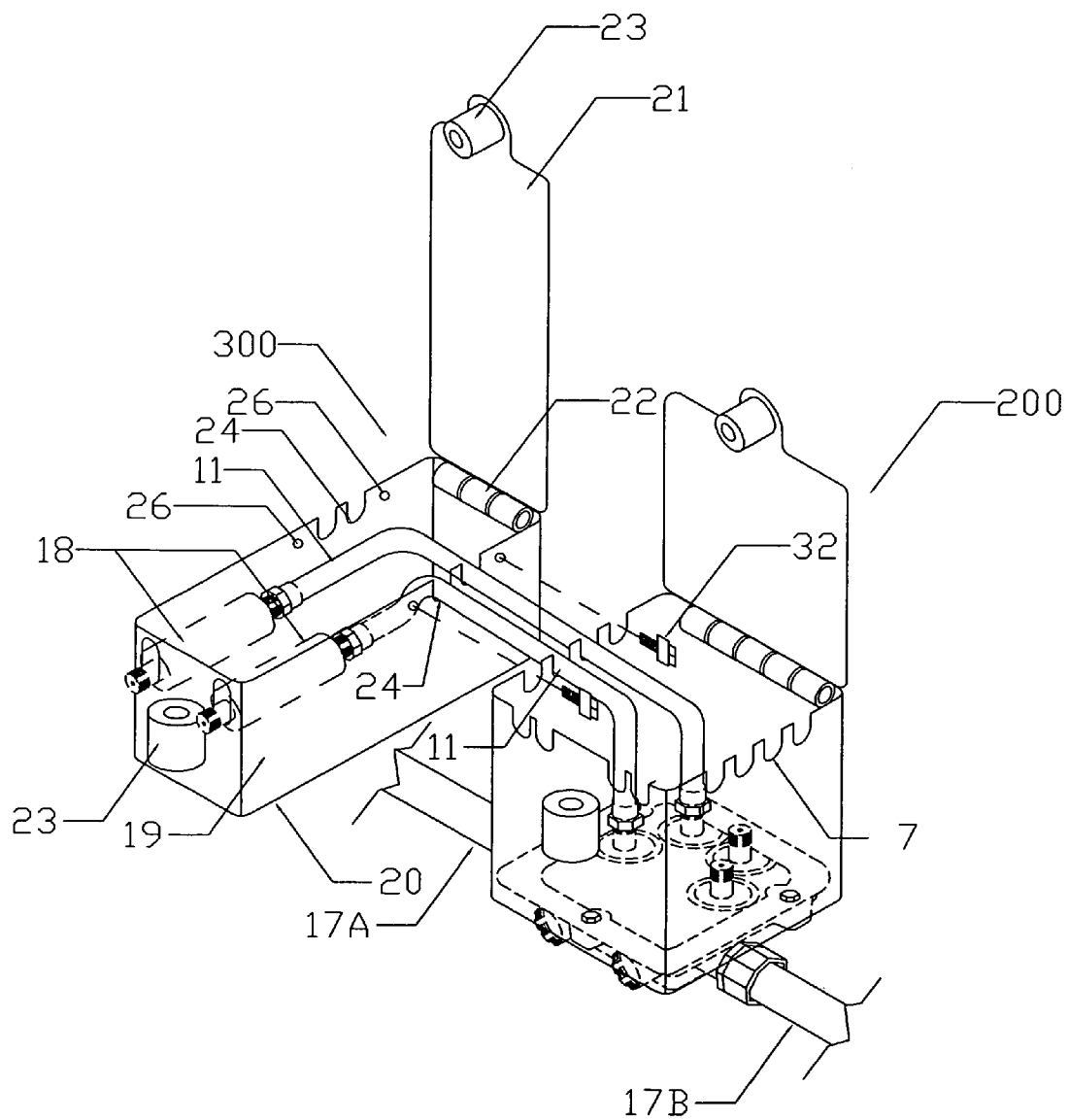
FIG. 7 is a perspective view of one embodiment of the security cover with an interior hinge and an attachable filter security box.

With reference to FIGS. 7 and 7A, the security cover may also include a "slide-on" compartment that will provide security for traps and/or filters that may be added to the service drop cable 11. As can be appreciated from the design of the filter security box described herein, the filter security box could also be used for other devices such as modems, monitoring equipment or data collecting equipment. As described below, traps and filters have the same function and the terms are used interchangeably herein. In a typical cable television system, the line-in 17A includes all the channels that the cable TV provider offers. Absent a filter, the service drop line 11 will also carry all the channels that the cable TV provider offers. However, the cable TV provider generally provides varying levels of service with each level offering a different line-up of channels. In order to provide only the channels to which the subscriber is entitled, the cable TV provider adds a filter 18 to the service drop cable 11. The filter 18 removes the channels that the subscriber has not paid for from the signal being carried by the service drop cable 11. In order to steal channels that the subscriber has not paid for, the subscriber would only need to replace the filter 18 with a different filter 18 or remove the filter 18 entirely. Thus, providing security for the filters 18 may be as important as providing security for the distribution tap 100 itself.

FIGS. 7 and 7A show two embodiments of a filter security box 300 that optionally attaches to a security cover 200. Filters 18 are typically connected directly in-line with the service drop cable 11. Accordingly, the filter security box 300 consists of a completely enclosed box including four filter box sides 19, a filter box bottom 20 and a filter box lid 21. With reference to FIG. 7A, in one embodiment, the filter box lid 21 is attached to the filter security box 300 via a filter box "Z" hinge 22A which is inserted through an exterior side 19 of the filter security box 300 into a filter box hinge slot 31A as the filter box lid 21 is rotated closed. In an embodiment shown in FIG. 7, an interior filter box hinge 22 is used that allows the filter box lid 21 to be rotated closed. The filter security box 300 also includes means for locking the filter box lid 21 to at least one of the filter box sides 19. In the embodiments shown in FIGS. 7 and 7A, the means for locking comprises a barrel or plunger type lock 13. In this embodiment, the filter security box 300 includes a filter box lock housing 23 incorporated into the filter box lid 21 and one of the filter box sides 19 designed to accept a barrel or plunger type lock 13. Filter box service drop cable notches 24 are provided in the filter box sides 19. The service drop cables 11, may then be run out of the security cover 200 via the service drop cable notches 7 in the security cover 200 and then through the filter box service drop cable notches 24 in the filter security box 300 where they are attached to the input of the filter 18. Additional service drop cables 11 are attached to the output of the filter 18 and fed out of filter box service drop cable notches 24 and to the subscriber. Once the service drop cables 11 are laid as desired in the filter box service drop cable notches 24, the filter box lid 21 may be securely closed against the filter box sides 19.

The filter security box 300 may be attached to the security cover 200 via fastening means. Although a wide variety of fastening means are suitable, one such fastening means is shown in FIGS. 7A and 8A wherein the filter security box 300 is attached to the security cover 200 using one or more "U" shaped fasteners 25. The "U" shaped fastener 25 is comprised of two parts, the sides 28 and a shoulder section 29. The shoulder 29 is designed to slide down into the service drop cable notches 7 of the security cover 200 and service drop cable notches 24 of the filter security box 300. The sides 28 of the fastener 25 are larger than notches 7 of the security cover 200 and notches 24 of the filter security box 300 to prevent prying the units apart to gain access to service drop cable 11.

Figure 8:
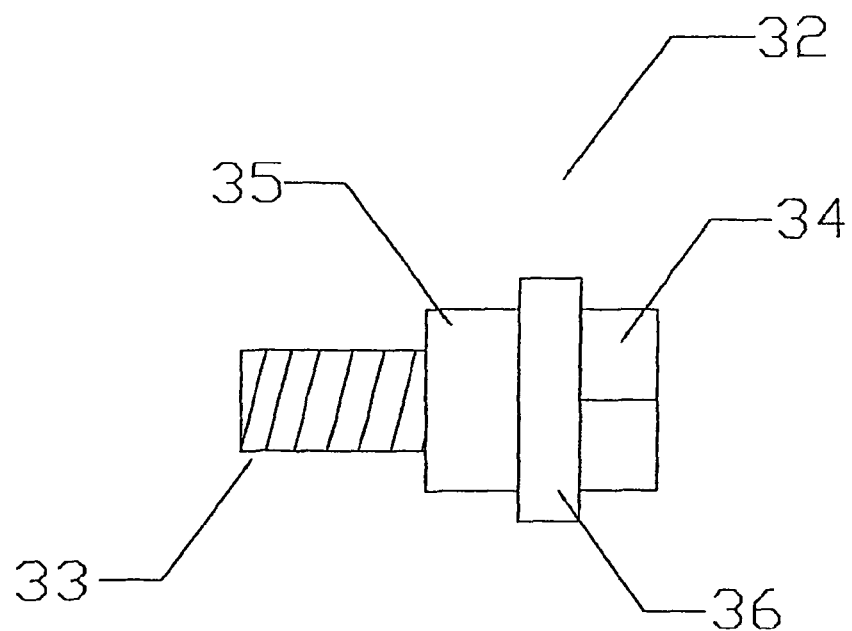
FIG. 8 contains a side view of the first of two embodiments of fastening devices used to attached the filter security box to the security.
Figure 8A:
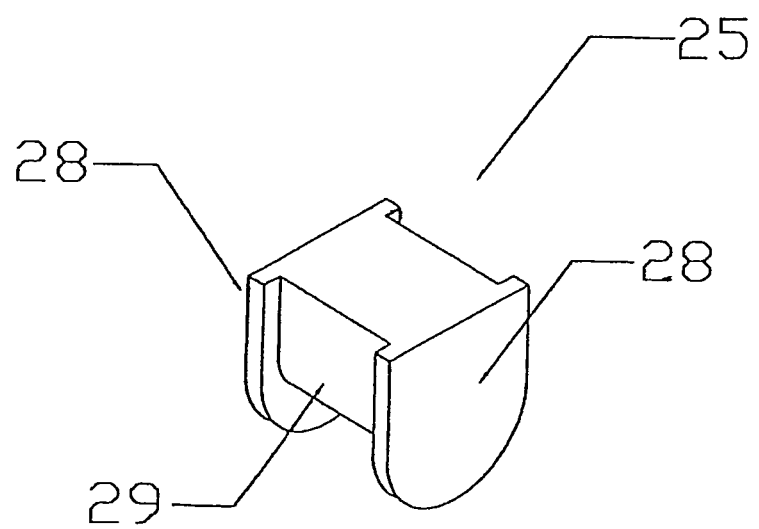
FIG. 8A contains a side view of the second of two embodiments of fastening devices used to attached the filter security box to the security.

An alternative fastening means is shown in FIGS. 7 and 8 wherein the filter security box 300 is attached to the security cover 200 using a bolt(s) 32. The bolt 32 has a threaded end 33 and a head end 34. The bolt 32 also has a small shoulder 35 designed to slide down into the service drop cable notches 7 of the security cover 200 and a large shoulder 36 designed to butt up against but not pass through the service drop cable notches 7. The filter security box 300 is attached by passing the bolt(s) 32 from the interior of the security cover 200 through a service drop cable notch 7 of the security cover 200 so that the small shoulder 35 of the bolt 32 lays in a service drop cable notch 7 and the large shoulder 36 of the bolt 32 butts up against the interior of the side 10 of the security cover 200 and the thread end 33 of the bolt 32 is threaded through a bolt hole 26 in one of the filter box sides 19 of the filter security box 300. The threaded end 33 may be long enough so that an additional nut (not shown) may be threaded onto the thread end 33 from the interior of the filter security box 300.

The scope of this disclosure includes embodiments of the security cover applicable to securing other shapes and types of taps either in existence now or to be created. For example, embodiments of the security cover 200 within this disclosure would include one walled or sided security covers for circular taps, three walled or sided security covers for triangular taps, etc. Similarly, the sides do not need to be either parallel to one another or perpendicular to the distribution tap but could vary.

Whereas the disclosure has been shown and described in connection with the preferred embodiment thereof and a few variations, many modifications, substitutions and additions may be made which are within the intended broad scope of the disclosure.

What is claimed is:

1. A security cover for a distribution tap comprising: one or more walls; a lid attachable to said walls; said walls and said lid fitting over and substantially enclosing the service ports of said tap without barring access to the test ports; a lock to secure said lid to said walls; openings in said security cover for cable; and said security cover being attachable to said tap via the interior of said security cover.

2. The security cover of claim 1 wherein said security cover is attachable to said tap via said tap's existing mounting points.

3. The security cover of claim 1 wherein said openings for cable are notches in one or more of said walls.

4. The security cover of claim 1 wherein said openings for cable are notches in said lid.

5. The security cover of claim 1 further comprising a base plate, the top side of said base plate being attachable to said walls and the bottom side of said base plate being attachable to said tap and said base plate having one or more openings to said service ports of said tap.

6. The security cover of claim 5 wherein said base plate is attachable to said tap via said tap's existing mounting points.

7. The security cover of claim 5 wherein said base plate is substantially open to said tap.

8. The security cover of claim 1 further comprising an attachable filter security box.

9. The security cover of claim 1 wherein said lock is a barrel and plunger lock.

10. The security cover of claim 1 wherein said lid is attached to said walls via the use of two locks.

11. The security cover of claim 1 wherein said lid is attached to said wall via an interior hinge.

12. The security cover of claim 1 wherein said lid is attachable to said wall via a Z-hinge.

13. A security cover for a distribution tap comprising: one or more walls; a lid attachable to said walls via a z-hinge; said lid and said walls fitting over and substantially enclosing the service ports of said tap; a barrel and plunger lock to secure said lid to said walls; a base plate, the top side of said base plate being attachable to said walls and the bottom side of said base plate being attachable to said tap and said base plate being substantially open to said service ports of said tap; notches in at least one wall for cable; and said security cover being attachable via the interior of said security cover to said tap via said tap's existing mounting points.

14. The security cover of claim 13 further comprising an attachable filter security box.

* * * * *